(12) United States Patent
Wagoner et al.

(10) Patent No.: US 9,337,685 B2
(45) Date of Patent: May 10, 2016

(54) OPTIMIZED FILTER FOR BATTERY ENERGY STORAGE ON ALTERNATE ENERGY SYSTEMS

(71) Applicant: General Electric Company, Schenectady, NY (US)

(72) Inventors: Robert Gregory Wagoner, Roanoke, VA (US); Allen Michael Ritter, Roanoke, VA (US)

(73) Assignee: General Electric Company, Schenectady, NY (US)

(*) Notice: Subject to any disclaimer, the term of this patent is extended or adjusted under 35 U.S.C. 154(b) by 86 days.

(21) Appl. No.: 14/138,224

(22) Filed: Dec. 23, 2013

(65) Prior Publication Data

US 2015/0180273 A1 Jun. 25, 2015

(51) Int. Cl.
| | |
|---|---|
| *B60L 11/12* | (2006.01) |
| *H02P 9/04* | (2006.01) |
| *F03D 9/00* | (2006.01) |
| *H02J 3/14* | (2006.01) |
| *H02J 7/14* | (2006.01) |
| *H02M 5/44* | (2006.01) |

(Continued)

(52) U.S. Cl.
CPC ............ *H02J 7/1415* (2013.01); *F03D 9/003* (2013.01); *H02J 3/32* (2013.01); *H02J 3/386* (2013.01); *H02M 1/12* (2013.01); *H02M 5/293* (2013.01); *H02M 5/44* (2013.01); *H02P 9/007* (2013.01); *H02M 2001/123* (2013.01); *Y10T 307/406* (2015.04)

(58) Field of Classification Search
CPC ...... Y02E 10/723; Y02E 10/725; Y02E 10/72; Y02E 10/766; Y02E 40/32; H02P 2101/15; H02P 9/007; H02P 21/0039; H02P 2201/05; H02P 27/06; H02P 9/46; F03D 7/00; F03D 9/02; F05B 2220/706; H02J 3/386; Y02B 10/30; Y10T 307/50; H02M 5/4505; H02M 5/4585
USPC .................... 290/50, 42–44, 53–55
See application file for complete search history.

(56) References Cited

U.S. PATENT DOCUMENTS

| | | |
|---|---|---|
| 4,352,049 A | 9/1982 | Franz, Jr. |
| 4,864,483 A * | 9/1989 | Divan .............................. 363/37 |

(Continued)

FOREIGN PATENT DOCUMENTS

| | | | |
|---|---|---|---|
| EP | 1475882 A2 * | 11/2004 | ............ H02M 5/458 |
| WO | WO 2013026179 A1 * | 2/2013 | ............... H02M 1/14 |

OTHER PUBLICATIONS

Related U.S. Appl. No. 14/088,730, filed Nov. 25, 2013.

(Continued)

*Primary Examiner* — Tulsidas C Patel
*Assistant Examiner* — Charles Reid, Jr.
(74) *Attorney, Agent, or Firm* — Dority & Manning, P.A.

(57) ABSTRACT

A system for operating a power generation system within a battery storage/discharge mode includes a power convertor having a DC link, a switching module coupled to the DC link, a storage device, and a filter coupled between the storage device and power converter. The filter may correspond to a normal mode filter configured to limit normal mode voltage from being applied to the storage device. A common mode filter may be associated with the storage device. The storage device may correspond to one or more batteries while the power generation system may correspond to a wind-driven generator.

18 Claims, 5 Drawing Sheets

(51) Int. Cl.
*H02P 9/00* (2006.01)
*H02M 1/12* (2006.01)
*H02M 5/293* (2006.01)
*H02J 3/32* (2006.01)
*H02J 3/38* (2006.01)

(56) References Cited

U.S. PATENT DOCUMENTS

| | | | |
|---|---|---|---|
| 5,798,632 A * | 8/1998 | Muljadi | 322/29 |
| 6,856,038 B2 * | 2/2005 | Rebsdorf et al. | 290/44 |
| 6,856,040 B2 * | 2/2005 | Feddersen et al. | 290/44 |
| 6,984,897 B2 * | 1/2006 | Skeist et al. | 290/44 |
| 7,102,247 B2 | 9/2006 | Feddersen | |
| 7,164,562 B2 | 1/2007 | Virtanen | |
| 7,332,827 B2 | 2/2008 | Nielsen | |
| 7,476,987 B2 * | 1/2009 | Chang | 290/55 |
| 7,518,256 B2 | 4/2009 | Juanarena Saragueta et al. | |
| 7,573,145 B2 * | 8/2009 | Peterson | 290/44 |
| 7,579,702 B2 * | 8/2009 | Park et al. | 290/44 |
| 7,859,125 B2 | 12/2010 | Nielsen et al. | |
| 7,888,915 B2 * | 2/2011 | Zhao et al. | 322/47 |
| 7,939,954 B2 | 5/2011 | Ruiz Flores et al. | |
| 8,093,742 B2 | 1/2012 | Gupta et al. | |
| 8,207,623 B2 | 6/2012 | Rivas et al. | |
| 8,373,293 B2 | 2/2013 | Engelhardt et al. | |
| 8,577,508 B2 * | 11/2013 | Li et al. | 700/287 |
| 8,698,335 B2 * | 4/2014 | Dai et al. | 290/44 |
| 2002/0063547 A1 * | 5/2002 | Turner et al. | 318/701 |
| 2004/0212359 A1 * | 10/2004 | Slater et al. | 324/76.77 |
| 2005/0258795 A1 * | 11/2005 | Choi | 318/625 |
| 2006/0208493 A1 * | 9/2006 | Harbourt et al. | 290/44 |
| 2006/0227483 A1 * | 10/2006 | Akagi | H02M 1/12 361/118 |
| 2007/0085344 A1 * | 4/2007 | Janssen et al. | 290/44 |
| 2007/0267873 A1 * | 11/2007 | Teichmann | 290/44 |
| 2008/0150285 A1 * | 6/2008 | Corcelles Pereira et al. | 290/44 |
| 2008/0157530 A1 * | 7/2008 | Corcelles Pereira et al. | 290/44 |
| 2008/0239775 A1 | 10/2008 | Oughton et al. | |
| 2009/0008937 A1 | 1/2009 | Erdman et al. | |
| 2009/0121483 A1 * | 5/2009 | Xiong et al. | 290/44 |
| 2009/0186535 A1 * | 7/2009 | Sullivan | 440/6 |
| 2010/0060000 A1 * | 3/2010 | Scholte-Wassink | 290/44 |
| 2011/0057444 A1 * | 3/2011 | Dai et al. | 290/44 |
| 2011/0106325 A1 * | 5/2011 | Opina et al. | 700/287 |
| 2011/0140430 A1 | 6/2011 | Ritter et al. | |
| 2011/0215772 A1 | 9/2011 | Sheng et al. | |
| 2012/0257429 A1 * | 10/2012 | Dong et al. | 363/127 |
| 2014/0169055 A1 * | 6/2014 | Fornage | H02M 3/1582 363/132 |

OTHER PUBLICATIONS

European Search Report and Opinion issued in connection with corresponding EP Application No. 14197919.5 on May 21, 2015.

\* cited by examiner

OPTIMIZED FILTER FOR BATTERY ENERGY STORAGE ON ALTERNATE ENERGY SYSTEMS

FIELD OF THE INVENTION

The present subject matter relates generally to power generation systems, and more particularly to a system and method for improving operation of power generation systems employing power storage/discharge systems, including battery energy storage systems.

BACKGROUND OF THE INVENTION

Power generation systems often include a power converter that is configured to convert an input power into a suitable power for application to a load, such as a generator, motor, electrical grid, or other suitable load. For instance, a power generation system, such as a wind turbine system, may include a power converter for converting variable frequency alternating current power generated by the wind turbine system into alternating current power at a grid frequency (e.g. 50 Hz or 60 Hz) for application to a utility grid. An exemplary power generation system may generate AC power using a wind-driven doubly fed induction generator (DFIG), as known in the art. A power converter associated with the DFIG can be used to regulate the flow of electrical power between the DFIG and the grid or other load.

In other power generating wind turbine systems, for example, a so-called full power conversion system, conversion systems are also employed including a power converter for converting variable frequency alternating current power generated by the wind turbine system into alternating current power at a grid frequency. Both the DFIG and full power conversion systems employ an AC-DC-AC conversion topology.

In still other power generating systems, for example, solar power generating systems, converters are also employed, for example, two-stage solar inverters, which have a DC-DC-AC inverter topology and are referred to herein as solar inverters.

Figure 3:
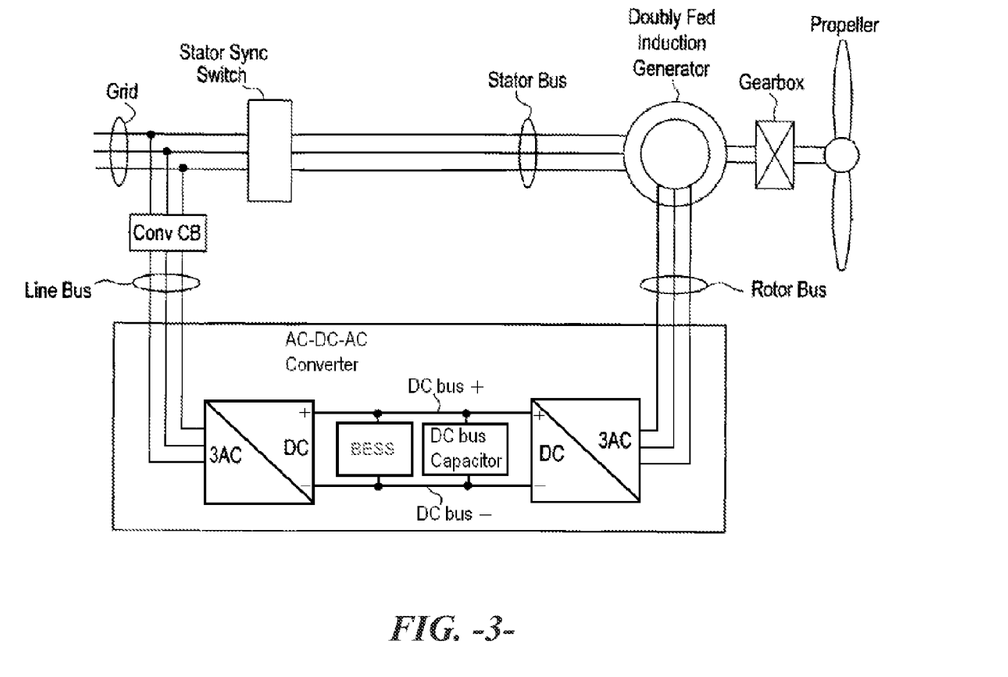
FIG. 3 illustrates a DFIG Wind Turbine System Utilizing a Battery Energy Storage System (BESS) in accordance with the present subject matter connected to the DC bus.
Figure 4:
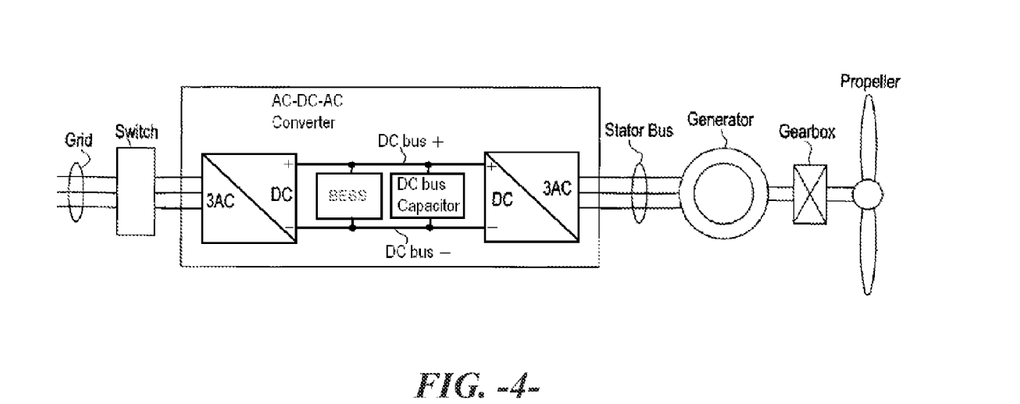
FIG. 4 illustrates a Full Power Conversion Wind Turbine System Utilizing the BESS in accordance with the present subject matter connected to the DC bus.
Figure 5:
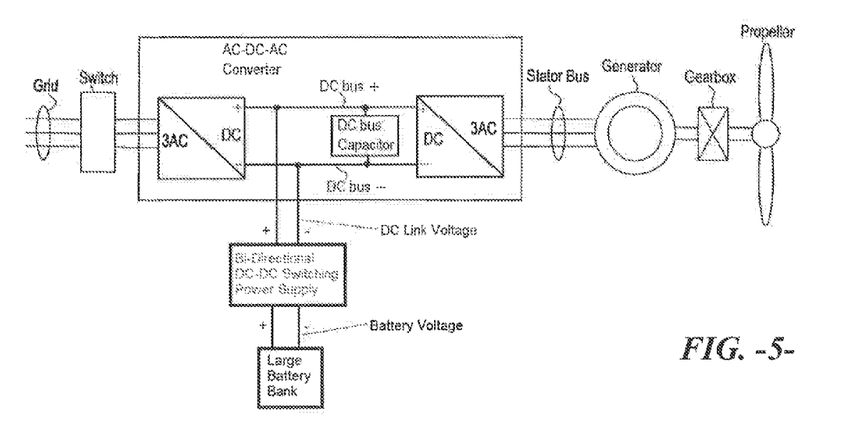
FIG. 5 illustrates an exemplary embodiment of a Full Power Conversion Wind Turbine System utilizing a state-of-art battery energy storage system, showing details of how a large battery may be connected to the DC bus though a bi-directional DC-DC switching power supply.

DFIG Wind Turbine Systems are well known with converters that do not include an energy storage system. New systems, however, are now being developed that utilize a battery for energy storage. Examples of such systems are shown in FIGS. 3 and 4. These systems generally include a battery and a bi-directional DC-DC switching power supply to transfer energy back and forth between the DC bus of the AC-DC-AC Converter and a large battery bank, as illustrated in FIG. 5. In addition to functioning as a battery charge controller, controlling the power flow to and from the battery, the bi-directional DC-DC switching power supply is also used to regulate the voltage of the battery at a level appropriate for the battery, which voltage level may not correspond to the same voltage as that of the DC Bus of the AC-DC-AC Converter or, in the case of a solar inverter, the DC-DC-AC converter. All of these systems have a large power converter with a regulated DC Bus.

Accordingly, a system and method for operating a power generation system that allows both storage and use of battery energy as a part of the alternating energy system is desirable. In such a system, it would be particularly desirable to avoid, or at least limit, common mode and normal mode voltages being applied to the energy storage battery incorporated into such alternating energy system.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for operating a power generation system within an energy storage/discharge mode. Such system may comprise a power convertor including a DC link, a switching module coupled to the DC link, an energy storage device, and a filter coupled between the switching module and the energy storage device. In such systems, the filter may correspond to a normal mode filter having a series coupled inductor and capacitor corresponding to an inductor leg and a capacitor leg where the inductor leg is coupled to the power converter and the capacitor leg is coupled to the DC link.

In certain embodiments, the switching module may be configured as a bi-directional DC-to-DC converter for controlling the flow of power to and from the energy storage device.

The energy storage device may be configured as a single battery in some embodiments, or a plurality of batteries in other embodiments, wherein the plurality of batteries may be connected in parallel.

In further embodiments, the system may include a second filter associated with the energy storage device, such as a common mode filter having an inductive device coupled in parallel with the capacitor leg of the normal mode filter.

In the system, the power converter may be configured as an IGBT pulse width modulator (PWM), with the inductor leg coupled to the IGBT PWM. The power converter may include at least a pair of IGBTs coupled in series across the DC link, wherein the inductive leg is coupled to a common point between the pair of IGBTs.

In a further aspect, the present subject matter is directed to a wind turbine system. The wind turbine system may generally include a wind-driven generator, a power convertor including a DC link associated with the wind-driven generator, a switching module coupled to the DC link, an energy storage device, and a filter coupled between the switching module and the energy storage device. In such systems, the filter may correspond to the filter configurations discussed above and set forth in greater detail below.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to power generation systems and, more particularly, to a system and method for improving operation of power generation systems that employ power storage/discharge systems including battery energy storage systems. Such systems may involve power generation systems having AC-DC-AC conversion topography such as, for example, wind turbine systems, as well as power generating systems having DC-DC-AC conversion topography such as, for example, solar inverter systems. It should be appreciated that the present subject matter is also applicable for use with other systems involving both AC-DC-AC and DC-DC-AC conversion topography. For example, the present subject matter may be used in systems including vehicles employing battery energy storage and discharge systems employing AC-DC-AC topologies to charge batteries to then supply power to AC driven motors. Similarly thermoelectric conversion systems employing a DC-DC-AC conversion topography may benefit from the present subject matter.

Figure 1:
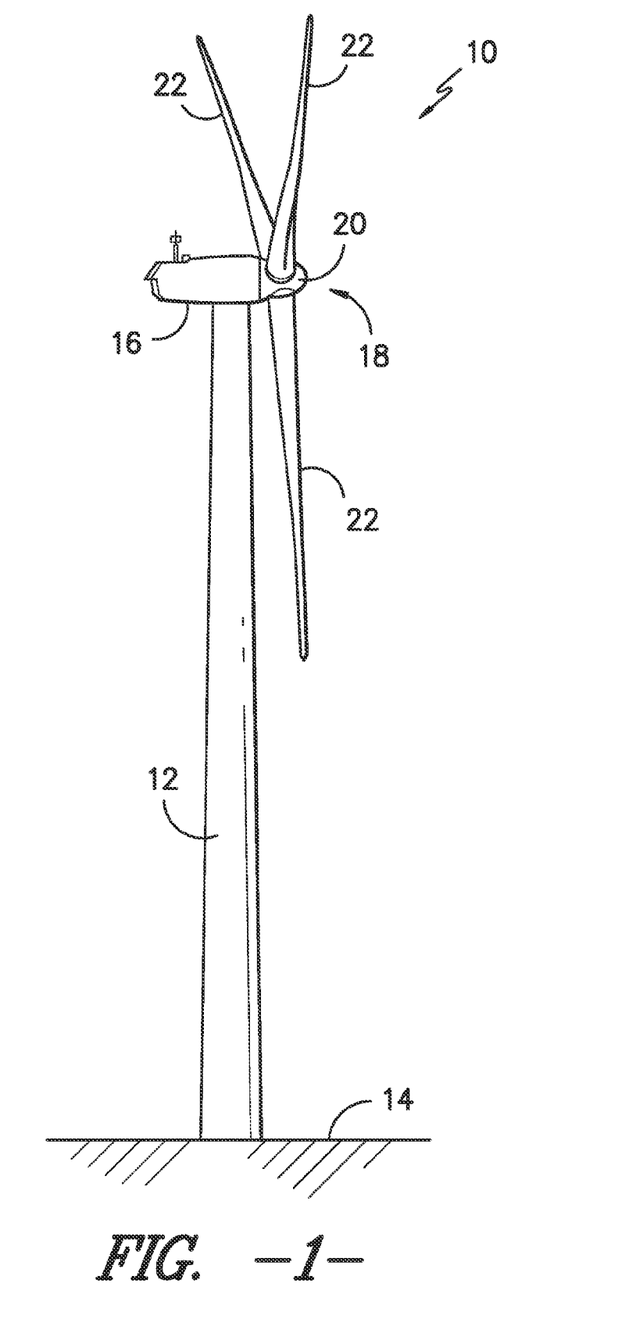
FIG. 1 illustrates a perspective view of one embodiment of a wind turbine that may incorporate aspects of the present invention.

Referring now to the drawings, FIG. 1 illustrates a perspective view of one embodiment of an exemplary wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) to permit electrical energy to be produced.

Figure 2:
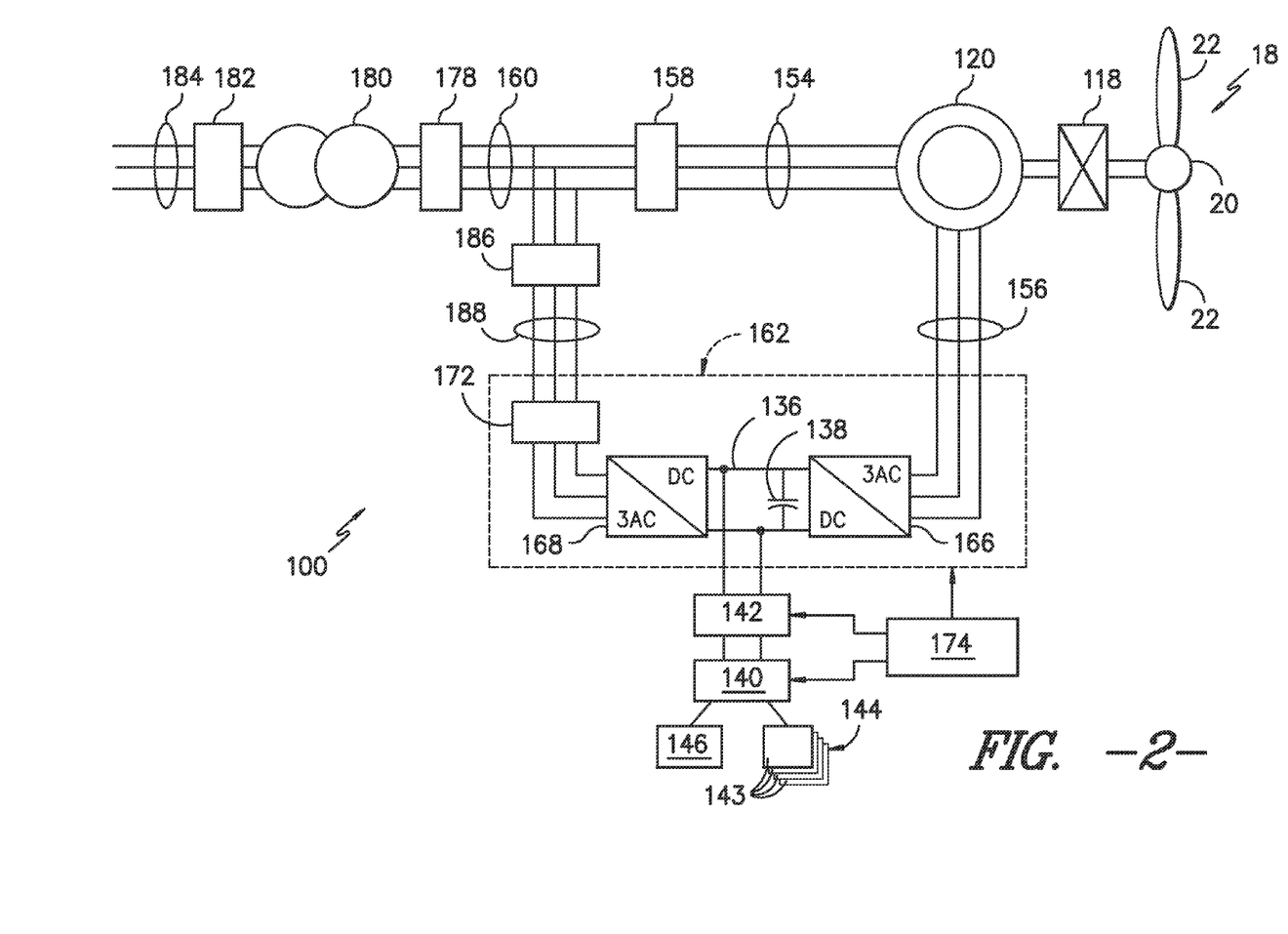
FIG. 2 illustrates a schematic view of one embodiment of a wind turbine system including a Battery Energy Storage System (BESS) in accordance with aspects of the present subject matter connected to a DC bus.

Referring now to FIG. 2, a schematic diagram of one embodiment of a wind turbine system 100 is illustrated in accordance with aspects of the present subject matter. As shown, the rotor 18 of the wind turbine 10 may, optionally, be coupled to a gear box 118, which is, in turn, coupled to a generator 120. In one embodiment, the generator 120 is a doubly fed induction generator (DFIG). Alternatively, the generator 120 may be any other suitable generator known in the art The generator 120 is coupled to a stator bus 154 and a power converter 162 via a rotor bus 156. The stator bus 154 provides an output multiphase power (e.g. three-phase power) from a stator of the generator 120 and the rotor bus 156 may provide an output multiphase power (e.g. three-phase power) from a rotor of the generator 120. As shown in FIG. 2, the power converter 162 includes a rotor side converter 166 and a line side converter 168. The generator 120 is coupled via the rotor bus 156 to the rotor side converter 166. Additionally, the rotor side converter 166 is coupled to the line side converter 168, which in turn is coupled to a line side bus 188.

In certain embodiments, the rotor side converter 166 and the line side converter 168 are configured for normal operating mode in a three-phase, pulse width modulation (PWM) arrangement using suitable switching elements, such as one or more IGBTs. The rotor side converter 166 and the line side converter 168 may be coupled via a DC link 136 across which is a DC link capacitor 138.

In addition, the power converter 162 may be coupled to a controller 174 in order to control the operation of the rotor side converter 166 and the line side converter 168. In general, the controller 174 may correspond to any suitable computing device and/or any combination of computing devices. For instance, the controller 174 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 174 to perform various functions.

In typical configurations, various line contactors and circuit breakers including, for example, a grid breaker 182 may be included for isolating the various components as necessary for normal operation of the generator 120 during connection to and disconnection from the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the generator 120 by rotating the rotor 18 is provided via a dual path to the electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 is combined with the power from the stator of generator 120 to provide multi-phase power (e.g. three-phase power) having a frequency maintained substantially at the frequency of the electrical grid 184 (e.g. 50 Hz or 60 Hz). It should be appreciated that the power flow through the converter 162 may be bi-directional and, thus, may be directed from the rotor-side to the line-side or from the line-side to the rotor-side (e.g., when operating at sub-synchronous speeds).

Additionally, various circuit breakers and switches, such as grid breaker 182, system breaker 178, stator sync switch 158, converter breaker 186, and line contactor 172 may be included in the system 100 to connect or disconnect corresponding buses, for example, when current flow is excessive and may damage components of the wind turbine system 100 or for other operational considerations. Additional protection components may also be included in the wind turbine system 100.

Moreover, the power converter 162 may receive control signals from, for instance, the controller 174. The control signals may be based, among other things, on sensed conditions or operating characteristics of the wind turbine system 100. Typically, the control signals provide for control of the operation of the power converter 162. For example, feedback in the form of a sensed speed of the generator 120 may be used to control the conversion of the output power from the rotor bus 156 to maintain a proper and balanced multi-phase (e.g. three-phase) power supply. In particular, the sensed speed may be used as a basis for adjusting the fundamental frequency of the PWM synthesized bridge voltages for the rotor-side converter 166. Additionally, feedback from other sensors may also be used by the controller 174 to control the power converter 162, including, for example, stator and rotor bus voltages, voltages associated with the switching elements and current feedbacks. Using the various forms of feedback information, switching control signals (e.g. gating control commands for the switching elements), stator synchronizing control signals, and circuit breaker signals may be generated.

As shown in FIG. 2, the system 100 may also include a selector switch 140 and one or more switching modules 142 coupled between the selector switch 140 and the DC link 136. The selector switch 140 may be configured to selectively couple the switching module(s) 142 to a storage device 144 or a resistive element 146 of the system 100. In such embodiments, by coupling the switching module(s) 142 to the storage device 144, the system 100 may be configured to operate within a power storage/discharge mode to allow power to be transmitted between the DC link 136 and the storage device 144 for storage therein and/or discharge therefrom. Similarly, by coupling the switching module(s) 142 to the resistive element 146, the system 100 may be configured to operate within a dynamic brake mode to allow power to be dissipated from the DC link 136.

For example, when operating in the power storage/discharge mode, the switching module(s) 142 may be configured to function as a bi-directional DC-to-DC converter (e.g., a DC chopper). Thus, to store power within the storage device 144, a switching element(s) of the switching module(s) 142 may be configured to be modulated in a manner that draws power from the DC link 136 and converts the voltage to an appropriate level for charging the storage device 144. Similarly, to discharge power from storage device 144, the switching element(s) of the module(s) 142 may be configured to be modulated in a manner that draws power from the storage device 144 and coverts the voltage to an appropriate level for the DC link 136.

In addition, when operating in the dynamic brake mode, the switching module(s) 142 may be configured to function as a brake chopper. Thus, the switching element(s) of the module(s) 142 may be modulated in a manner that regulates the DC link voltage by selectively connecting the DC link 136 to the resistive element 146, thereby providing a dynamic brake for dissipating power from the DC link 136.

It should be appreciated that the storage device 142 may generally comprise any number of storage elements configured for storing and/or discharging electrical power. For instance, as schematically depicted in FIG. 2, the storage device 144 may include a plurality of batteries 143 forming a large battery bank, wherein the plurality of batteries are connected in parallel. Alternatively, the storage device 144 may include a single battery, or any other suitable storage element(s). Similarly, it should be appreciated that the resistive element 146 may generally comprise any suitable component that allows electrical energy to be dissipated in the form of heat. For example, in one embodiment, the resistive element 146 may be a dynamic brake resistor.

FIGS. 3 through 5 illustrate alternate power generating configurations that utilize an energy storage device and may be equipped with the optimized filter configuration in accordance with aspects of the present subject matter. For example, FIG. 3 illustrates a DFIG Wind Turbine System Utilizing a Battery Energy Storage System (BESS) connected to the DC bus. The system of FIG. 3 may be configured with the switching module and selector switch of the embodiment of FIG. 2, or other suitable configuration.

FIG. 4 illustrates a Full Power Conversion Wind Turbine System Utilizing the BESS connected to the DC bus, wherein the BESS may be equipped with the optimized filter configuration in accordance with aspects of the present subject matter.

FIG. 5 illustrates an exemplary embodiment of a Full Power Conversion Wind Turbine System utilizing a state-of-art battery energy storage system, showing details of how a large battery may be connected to the DC bus though a bi-directional DC-DC switching power supply, which may be configured with the optimized filter configuration in accordance with aspects of the present subject matter.

Referring again to FIG. 2, the controller 174 may be communicatively coupled to both the switching module(s) 142 and the selector switch 140 in order to automatically control the operation of each component. In such embodiments, the controller 174 may be configured to transmit suitable control signals (e.g., switching commands) in order to control the operation of the switching module(s) 142 based on the current operating mode of the system 100. For instance, when operating in the power storage/discharge mode, the controller 174 may be configured to transmit suitable control signals to the switching module(s) 142 for controlling the flow of power between the DC link 136 and the storage device 144, such as by controlling the switching module(s) 142 in a manner that draws power from the DC link 136 when necessary to prevent overvoltage conditions and by controlling the switching module(s) 142 in a manner that draws power from the storage device 144 when it is desired to supply power back to the DC link 136. Similarly, when operating in the dynamic brake mode, the controller 174 may be configured to transmit suitable control signals to the switching module(s) 142 in order to regulate the DC link voltage by controlling the connection between the DC link 136 and the resistive element 146.

Additionally, the controller 174 may be configured to transmit suitable control signals (e.g., switching commands) in order to adjust the position of the selector switch 140, thereby toggling the operating mode of the system 100 between the power storage/discharge mode and the dynamic brake mode. As indicated above, the disclosed system 100 may be configured to transmit power to the storage device 144 as the primary means for regulating the DC link voltage, with the dynamic brake serving a back-up function. In such embodiments, the selector switch 140 may be configured to be positioned so that the switching module(s) 142 are normally coupled to the storage device 144. However, if it is determined that the storage device 144 has failed and/or any other issues exist with transmitting power to the storage device 144, the controller 174 transmit a control signal to the selector switch 140 in order to switch the operation of the system 100 to the dynamic brake mode, thereby allowing power to be dissipated, when necessary, from the DC link 136 via the resistive element 146.

As an alternative to automatically controlling the selector switch 140, the switch 140 may be configured to be manually operated. In such an embodiment, if it is determined that the storage device 144 has failed and/or any other issues exist with transmitting power to the storage device 144, a maintenance person or other personnel may be allowed to manually adjust the selector switch 140 in order to switch the system operation to the dynamic brake mode.

Figure 8:
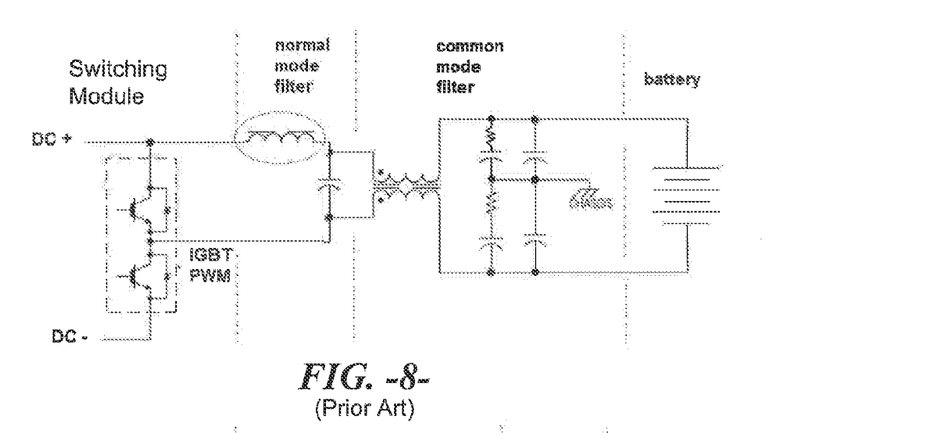
Figure 9:
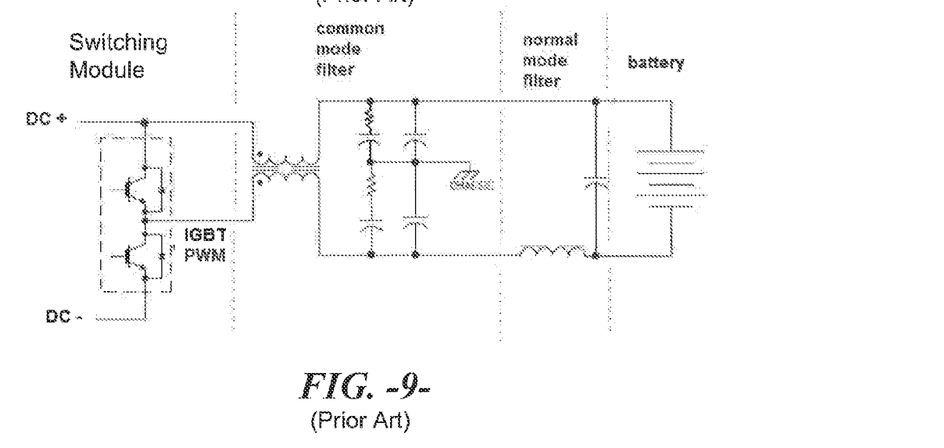

In accordance with aspects of the present invention, the system 100 may include a power converter having a DC link 136 and at least one switching module 142 coupled to the DC link, as described above. In exemplary embodiments, each switching module(s) 142 may correspond to a bi-directional DC-DC switching module permitting controlled charging of the one or more batteries 143, as well as controlled discharge of the one or more batteries into the DC link 136. Such DC-DC switching modules 142 may also have connected thereto and to the battery bank 143, a filter configuration designed to limit normal and common mode voltages being applied to the battery bank 143 that may tend to be detrimental to such battery bank. Several such filters are known in the art as, for example, illustrated in FIGS. 7-9 that are generally effective to address the battery bank protection desired. Unfortunately such known filters include drawbacks that tend to limit their effectiveness.

Figure 7:
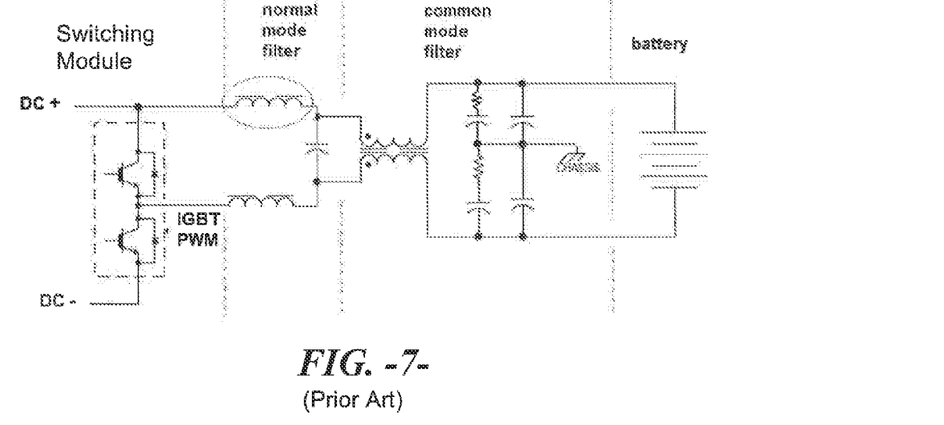
FIGS. 7-9 illustrate state of the art non-optimized filter constructions.

For example, the configuration in FIG. 7 has a drawback that the extra inductor in the DC leg of the normal mode filter allows more common mode voltage to be applied to the common mode filter, resulting in a requirement for a large common mode filter. The configurations illustrated in FIGS. 8 and 9 also have a similar drawback of resulting in a requirement for a large common mode filter.

Figure 6A:
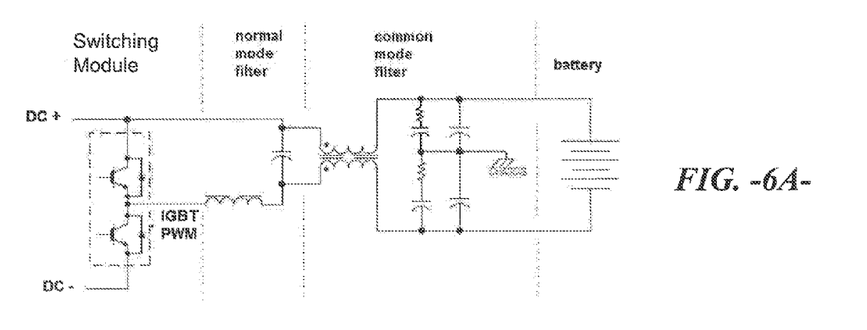
FIGS. 6A and 6B illustrate schematic views of exemplary optimized filter configurations for Bi-Directional DC-DC Switching Power Supplies constructed in accordance with the present subject matter.
Figure 6B:
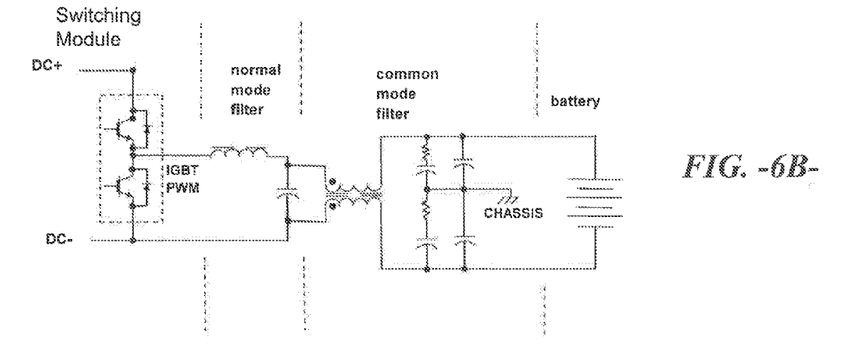

In accordance with the present subject matter, an optimized filter configuration has been provided as illustrated in FIGS. 6A and 6B. From FIG. 6A it should be appreciated that the normal mode filter corresponds to a series connected capacitor/inductor configuration wherein the inductor is coupled at one end to the converter and one end of the capacitor is coupled directly to the positive side of the DC bus. In an alternative configuration, as illustrated in FIG. 6B, one end of the capacitor is coupled directly to the negative side of the DC bus while the inductor is still coupled at one end to the converter. In addition, it should be noted that in both of the embodiments illustrated in FIGS. 6A and 6B, the common mode filter has its input terminals coupled across the capacitor. In particular embodiments, it is significant that the normal mode filter be closest to the converter, with the common mode filter being on the battery side. It should be appreciated that the presently illustrated common mode filter configurations are exemplary only and may, in practice, be provided in other arrangements including incorporating any or all of the capacitors and resistors presently illustrated as well as in configurations and embodiments including other forms of common mode filters.

Those of ordinary skill in the art will appreciate that other configurations of the present subject matter are possible. For example the common mode filter may be placed closest to the converter while the normal mode filter is placed on the battery side. Such a configuration, however, would require a larger common mode inductor.

In accordance with the present subject matter, certain aspects are important to realizing the improved filter features desired. A first such aspect calls for connecting the DC link directly to the common mode filter, that is, directly to either the positive or negative terminal of the DC link as illustrated in FIGS. 6A and 6B, respectively, as this reference point has lower common mode voltage with respect to the chassis than the other node. Another important aspect is that the normal mode inductor should be placed only on the IGBT PWM leg output from the converter. This placement minimizes the common mode voltage applied to the common mode filter.

This particular filter arrangement has advantages of isolating the normal mode current from the common mode filter, which reduces the size and cost of the common mode inductor. It also has advantages of applying the signal from the DC link to the common mode filter, which has the lowest level of common mode voltage, again, which reduces the size and cost of the common mode inductor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for operating a power generation system within an energy storage/discharge mode, the system comprising:
    a power convertor including a DC link coupled between a first converter and a second converter;
    a switching module coupled to said DC link;
    an energy storage device; and
    a filter coupled between said switching module and said energy storage device,
    wherein said filter comprises a normal mode filter having a series coupled inductor and capacitor corresponding to an inductor leg and a capacitor leg, and wherein said inductor leg is coupled to an output leg of said switching module and said capacitor leg is coupled directly to said DC link.

2. The system of claim 1, wherein said switching module is configured as a bi-directional DC-to-DC converter for controlling the flow of power to and from said energy storage device.

3. The system of claim 1, wherein said energy storage device comprises at least one battery.

4. The system of claim 1, wherein said energy storage device comprises a plurality of batteries.

5. The system of claim 4, wherein said plurality of batteries are coupled in parallel.

6. The system of claim 1, further comprising a second filter associated with said energy storage device.

7. The system of claim 6, wherein said second filter comprises a common mode filter.

8. The system of claim 7, wherein said common mode filter comprises an inductive device coupled in parallel with said capacitor leg of said normal mode filter.

9. The system of claim 1, wherein said switching module comprises at least a pair of IGBTs coupled in series across said DC link and said inductive leg is coupled to a common point between said pair of IGBTs.

10. A wind turbine system, comprising:
a wind-driven generator;
a power convertor including a DC link associated with said wind-driven generator;
a switching module coupled to said DC link;
an energy storage device; and
a filter coupled between said switching module and said energy storage device,
wherein said filter comprises a normal mode filter having a series coupled inductor and capacitor corresponding to an inductor leg and a capacitor leg, and
wherein said inductor leg is coupled to an output leg of said switching module and said capacitor leg is directly coupled to said DC link.

11. The system of claim 10, wherein the switching module is configured to be operated as a bi-directional DC-to-DC converter for controlling the flow of power to and from said energy storage device.

12. The system of claim 10, wherein, said energy storage device comprises one or more batteries.

13. The system of claim 12, wherein said energy storage device comprises a plurality of batteries coupled in parallel.

14. The system of claim 10, further comprising a second filter associated with said energy storage device.

15. The system of claim 14, wherein said second filter comprises a common mode filter configured as an inductive device coupled in parallel with said capacitor leg of said normal mode filter.

16. The system of claim 10, wherein said switching module comprises at least a pair of IGBTs coupled in series across said DC link and said inductive leg is couple to a common point between said pair of IGBTs.

17. A method for operating a power generation system within an energy storage/discharge mode, the power generation system including a power convertor having a DC link, the power generation system further including a switching module coupled to the DC link and an energy storage device, the method comprising:
controlling the operation of the switching module such that power is directed between the DC link and the energy storage device; and
transmitting the power through a filter coupled between the DC link and the energy storage device, the filter comprising a normal mode filter having a series coupled inductor and capacitor corresponding to an inductor leg and a capacitor leg, the inductor leg being coupled to an output leg of the switching module and the capacitor leg being directly coupled to the DC link.

18. The method of claim 17, wherein the filter is a first filter, the method further comprising transmitting the power through a second filter coupled between the DC link and the energy storage device, the second filter being configured as a common mode filter.

\* \* \* \* \*